United States Patent
Chen et al.

(10) Patent No.: US 9,295,925 B2
(45) Date of Patent: Mar. 29, 2016

(54) STRUCTURED PACKING AND METHOD

(71) Applicants: Guang X. Chen, Williamsville, NY (US); Kirk Frederick Larson, Amherst, NY (US)

(72) Inventors: Guang X. Chen, Williamsville, NY (US); Kirk Frederick Larson, Amherst, NY (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 549 days.

(21) Appl. No.: 13/711,029

(22) Filed: Dec. 11, 2012

(65) Prior Publication Data

US 2014/0158519 A1    Jun. 12, 2014

(51) Int. Cl.
*B01D 3/00* (2006.01)
*B01J 19/32* (2006.01)
*F25J 3/02* (2006.01)
*B01D 3/16* (2006.01)

(52) U.S. Cl.
CPC ............... *B01D 3/008* (2013.01); *B01J 19/32* (2013.01); *B01D 3/16* (2013.01); *B01J 2219/3221* (2013.01); *B01J 2219/32206* (2013.01); *B01J 2219/32213* (2013.01); *B01J 2219/32217* (2013.01); *B01J 2219/32227* (2013.01); *B01J 2219/32244* (2013.01); *B01J 2219/32258* (2013.01); *B01J 2219/32272* (2013.01); *F25J 3/028* (2013.01)

(58) Field of Classification Search
CPC ............... F25J 3/28; B01J 2219/32206; B01J 2219/3221; B01J 19/32; B01J 2219/32213; B01J 2219/32217; B01D 3/008; B01D 3/16

USPC ............... 428/182, 183, 184, 186; 261/112.2; 422/631; 95/211

See application file for complete search history.

(56) References Cited

U.S. PATENT DOCUMENTS

| | | | |
|---|---|---|---|
| 5,632,934 A | 5/1997 | Billingham et al. | |
| 6,206,349 B1 | 3/2001 | Parten | |
| 2001/0040303 A1 | 11/2001 | Ender et al. | |
| 2003/0190461 A1* | 10/2003 | McKeigue et al. | 428/185 |
| 2005/0040549 A1* | 2/2005 | Lehman et al. | 261/112.2 |
| 2007/0023936 A1* | 2/2007 | Sunder | 261/94 |
| 2013/0313103 A1* | 11/2013 | Billingham et al. | 203/89 |

* cited by examiner

*Primary Examiner* — In Suk Bullock
*Assistant Examiner* — Jonathan Pilcher
(74) *Attorney, Agent, or Firm* — Robert J. Hampsch; David M Rosenblum (57) ABSTRACT

A structured packing formed of a plurality of corrugated, rectangular sheets and a method relating to the use thereof. End regions of the corrugations are provided with straight, parallel corrugations extending inwardly from opposed edges of the sheets and a right angles thereto to reduce pressure drop at the interfaces between packing layers and thereby increase hydraulic capacity. Contact is promoted between descending liquid and ascending vapor phases within a main region of the corrugations that have straight, parallel sections of the corrugations oriented at an acute angle to the opposed edges. Transition regions having arcuate sections of the corrugations connect corrugations within the main and end regions to reduce internal pressure drop within the structured packing and thereby further reduce pressure drop at the interfaces and further increase the hydraulic capacity.

6 Claims, 6 Drawing Sheets

STRUCTURED PACKING AND METHOD

FIELD OF THE INVENTION

The present invention relates to a structured packing and a method of using such structured packing in which the structured packing is formed from a plurality of rectangular sheets arranged in a juxtaposed relationship and having a repeating undulating pattern of corrugations that cross one another in adjacent sheets. More particularly, the present invention relates to such a structured packing and method in which the corrugations of each of the sheets have end regions where the corrugations are at right angles to an edge of the sheet, main regions where the corrugations are oriented at an acute angle to the edges of the sheet and transition regions, connecting corrugations within the end and main regions and having corrugations of arcuate configuration.

BACKGROUND OF THE INVENTION

Structured packings have long been used as mass transfer contacting elements for such purposes as conducting distillation and absorption processes. A key advantage of structured packings is that they provide a large surface area for mass transfer while at the same time exhibit a low pressure drop over a wide operational range. For instance, such structured packings are advantageously utilized in the cryogenic distillation of air to lower pressure drop within a low pressure column of an air separation unit also having a high pressure column linked to the low pressure column in a heat transfer relationship. The lower pressure drop within the low pressure column with the use of such structured packings, as opposed to trays, decreases the pressure to which the incoming air is required to be compressed and therefore, also the electrical power consumption. Additionally, such structured packing is used in an argon column connected to the low pressure column to separate argon from oxygen with a sufficient number of stages of separation that the argon product contains substantially no oxygen.

Structured packings are formed by a plurality of corrugated sheets arranged in a side-by side relationship so that the corrugations in adjacent sheets cross one another. Where structured packing is used in distillation, the structured packings are arranged in vertical groupings of the packing or layers within a distillation column and are fed from the top by a liquid phase of a mixture to be separated and from the bottom by a vapor phase of the mixture. Due to the crossing of the corrugations, the liquid phase tends to spread out across the packing and descend as a film of the liquid. The vapor flows upwardly through the corrugations and also tends to spread out through the packing and contact the descending liquid. The intimate contact of the vapor and the liquid produces a variation of the liquid and vapor mixtures that tends towards equilibrium. As a result the descending liquid will become evermore concentrated in the less volatile components of the mixture to be separated as it descends through the packing and the vapor will increasing become evermore concentrated in the more volatile components of the mixture as it ascends through the packing. Structured packing is provided in layers in which the sheets in one layer are oriented at right angles to the other layer to further promote liquid and vapor mixing.

In structured packing, as well as any mass transfer contacting element, flooding represents a limitation at which the packing will no longer function. Every structured packing has a hydraulic flooding capacity in which the pressure drop starts to rise rapidly. The reason for this is that as the liquid flow in a downward direction through the packing is impeded as a result of excessive upflowing vapor, the liquid begins to build up at the interface between packing layers resulting in the rapid rise in pressure drop leading to flooding. It is to be noted that such pressure drop and resulting liquid holdup between layers is always greater in the interface between the layers of the packing than in the body of the packing because the channels for the flow formed between the corrugations, as between layers of packing, are not aligned. In any case, at about the same time an operational flooding point also begins to be reached at which the mass transfer efficiency of the packing rapidly decreases or in other words, the HETP (height equivalent to a theoretical plate) rises rapidly. The flooding limit for a particular structured packing, conducting a particular distillation, represents a limitation on the flow rate through the distillation column which is addressed in large part by proper selection of the density of the packing and/or providing a column diameter that will produce a sufficiently low vapor rate that flooding will never occur. However, as the density is decreased, the efficiency of the packing also decreases to in turn increase distillation column height requirements. Column sizes and diameters will have a direct effect on the fabrication costs of the plant. Consequently, it is important that the hydraulic flooding capacity of a particular structured packing be as high as possible.

As mentioned above, in conventional packing, the corrugations cross the packing at a constant acute angle with respect to the edges of the packing sheets. As between packing layers, the angle of the corrugations produce an abrupt change in flow direction of both the vapor and the liquid which acts to limit hydraulic capacity. The prior art has provided structured packing that has been designed with end or edge modifications to the corrugations to reduce the abrupt change in flow direction of the vapor to enhance the hydraulic capacity of such structured packing.

An example of a structured packing having an enhanced hydraulic capacity is disclosed in U.S. Pat. No. 5,632,934. In this patent, the corrugations of the structured packing have a central region in which the corrugations are set at an acute angle to opposite edges of the packing sheets and end regions that are at right angles to the opposite edges. The effect of this is to reduce resistance of the vapor as it flows from an underlying layer of packing and enters the layer of packing located above the underlying layer and to allow the liquid fall to an underlying layer with less resistance that conventional packing. As a result, the hydraulic capacity of such a packing is greater than conventional packing not having such an edge modification.

U.S. Pat. No. 6,206,349 discloses another structured packing that is also designed to have an enhanced hydraulic capacity. In the structured packing disclosed in this patent the corrugations within each packing sheets are provided with end or terminal portions that curve from a central section of corrugations towards the edges of the packing sheet so that the change in vapor flow direction is not abrupt and is more gradual. Also provided in this patent is a grid-like structure that could be placed between conventional packing sheets that do not incorporate the curved edge modification with the intent to decrease the change in vapor flow direction as it enters the overlying layer of structured packing.

As will be discussed, the present invention provides a structured packing which, among other advantages, has hydraulic capacity that is greater than the prior art discussed above and further, operational characteristics that are superior than those of the prior art.

SUMMARY OF THE INVENTION

The present invention provides a structured packing that comprises a plurality of rectangular sheets arranged in a juxtaposed relationship. Each of the rectangular sheets have two opposed surfaces, a plurality of openings located throughout and communicating between the two opposed surfaces and corrugations connecting two opposed edges and arranged in a repeating, undulating pattern having alternating peaks and troughs located adjacent to one another.

The corrugations of the rectangular sheets have end, main and transition regions. The end regions contain straight parallel sections of the corrugations extending inwardly from one of the two opposed edges of each of the sheets, at right angles thereto. The main regions contain straight, parallel sections of the corrugations oriented at an acute angle to the two opposed edges of each of the sheets and transition regions have arcuate sections of the corrugations connecting the straight, parallel sections of the corrugations of the main region and the transition region at opposite ends thereof. This connection is accomplished such that apices of the peaks of the straight, parallel sections of the corrugations are coincident with tangents to the apices of the peaks of the arcuate sections of the corrugations within the transition regions at the opposite ends thereof.

The rectangular sheets are oriented such that the end regions, the main regions and the transition regions are positioned opposite to one another with the straight, parallel sections of the corrugations of the main regions of adjacent rectangular sheets in a cries-crossing relationship.

The present invention also provides a method of contacting descending liquid and ascending vapor phases of a mixture to be distilled within a distillation column. In accordance with said method the descending liquid and ascending vapor phases are contacted within a plurality of layers of structured packing arranged vertically within the distillation column such that the descending liquid and the ascending vapor phases pass through interfaces, each located between the layers of the structured packing. Each of the layers of the structured packing comprise a plurality of rectangular sheets arranged in a juxtaposed relationship with the sheets in an overlying layer of the structured packing oriented at right angles to the sheets in an underlying layer of the structured packing. Each of the rectangular sheets having two opposed surfaces, a plurality of openings located throughout and communicating between the two opposed surfaces and corrugations connecting the two opposed edges and arranged in a repeating, undulating pattern having alternating peaks and troughs located adjacent to one another.

Pressure drop is reduced at the interfaces and hydraulic capacity of the structured packing is increased by passing the descending liquid and ascending vapor phases through an end regions of the corrugations located opposite to one another and having straight, parallel sections of the corrugations extending from at least a bottom of the two opposed edges of each of the sheets at right angles thereto. Contact between the descending liquid and ascending vapor phases is promoted within a main region of the corrugations having straight, parallel sections of the corrugations, spaced from the end region, oriented at an acute angle to the two opposed edges and with the corrugations within the main regions in a cries-crossing relationship in adjacent pairs of the rectangular sheets. Internal pressure drop within the structured packing is reduced, thereby further reducing pressure drop at the interfaces and further increasing hydraulic capacity by passing the descending liquid and ascending vapor phases through transition regions of the corrugations. The transition regions are located opposite to one another and have arcuate sections of the corrugations connecting the straight, parallel sections of the corrugations of the main regions and the transition regions at opposite ends thereof. This connection is accomplished such that apices of the peaks of the straight, parallel sections of the corrugations are coincident with tangents to the apices of the peaks of the arcuate sections of the corrugations within the transition regions at the opposite ends thereof.

As will be discussed, it has been found that the transition regions incorporating arcuate corrugations contribute to further enhancements of hydraulic capacity over the prior art. While not wishing to be held to a theory of operation, it is believed by the inventor herein that in prior art structured packing only having an end modification in which the corrugations are at right angles to the edges of the packing sheet, the liquid and vapor internally within the packing make an abrupt change in direction within the packing sheet itself leading to internal turbulence and pressure drop. This has an effect on the edge of the packing where the vapor enters and the liquid is discharged. In case of a packing having a curved modification extending to the edge of the packing sheet, it is believed that in changing direction, the vapor upflow forces the concurrently descending liquid against the channel formed between corrugations leading to internal liquid holdup and pressure drop. Where a grid of channels is used between packing sheets, even if in someway, such channels could be made to line up with corrugations, the channel section itself provides two interfaces where before there was one; and therefore, two places for liquid to collect and produce a pressure drop. As a result, it is believed that the hydraulic capacity of a structured packing in accordance with the present invention would be less than either of the prior art options discussed above. In this regard, a mismatch between the grid channels and the corrugations would only exacerbate the problem. Although not mentioned in the above patent, it is believed that if such a grid were used even with the curved end modification, the problems of having two interfaces would lower any advantages to be obtained by the curved end section modification and consequently, one would not be led to combine the two. Furthermore, such a grid section would not be desirable in that it would tend to increase the height of the column which would add to the expense of fabricating the column in the first instance.

In any case, in the present invention, unlike the prior art, the arcuate corrugations of the transition region is located internally within the packing itself. Consequently, the advantages of having an end modification that is at right angles to the edge of the packing sheet are realized. At the same time, by the time the upflow of vapor has reached the internal curved transition region of the present invention, its superficial velocity has decreased due to its interaction with the concurrent flow of liquid further decreasing pressure drop within the packing itself and therefore, providing less resistance to the flow of vapor and liquid at the edge of the packing sheet. A further advantage of the present invention is that the arcuate corrugations within the transition region act to relive stress produced by overlying packing layers that would otherwise be intensified by a sharp change in direction of the corrugations from the acute angle to the right angle.

In a structured packing in accordance with the present invention, the end regions and the transition regions can be first end regions and first transition regions. In such case, the corrugations of the rectangular sheet have second end regions and second transition regions identical to the first end regions and the first transition regions and with the second transition regions configured as a mirror image of the first transition regions. The straight, parallel sections of the corrugations of the second end regions extend from the other of the two opposite edges of each of the sheets and the arcuate sections of the corrugations of the second transition regions connect the straight, parallel sections of the corrugations of the second end region and the main region at the opposite ends thereof. In connection with a method of the present invention, the descending liquid and ascending vapor phases are passed through second end regions and second transition regions of the corrugations of the rectangular sheets.

Moreover, in a structured packing of the present invention or a method of the present invention using such structured packing, each of the apices can be curved and each of the corrugations can have a triangular, transverse cross-section with two equal sides connected by the curved apices. Further, each of the straight, parallel sections of the corrugations within the end regions can have a length equal to about a corrugation width of the corrugations multiplied by a constant within a range between 0.3 and 4.0 and the arcuate sections of the corrugations within the transition regions can each have a radius in a range of between about 25.0 percent and about 75.0 percent of the corrugation width. Preferably, the radius of curvature can be about 50.0 percent of the corrugation width and the constant can be between 1.0 and 3.0. More preferably, the constant is 2.0 and the length is no less than about 1.27 cm. and no greater than about 3.81 cm. In any embodiment or aspect of the resent invention, the acute angle of the corrugations within the main region can be one of 40 degrees and 45 degrees.

BRIEF DESCRIPTION OF THE DRAWINGS

While the specification concludes with claims distinctly pointing out the subject matter that Applicant regards as his invention, it is believed that the invention will be better understood when taken in connection with the drawings in which:

DETAILED DESCRIPTION

Figure 1:
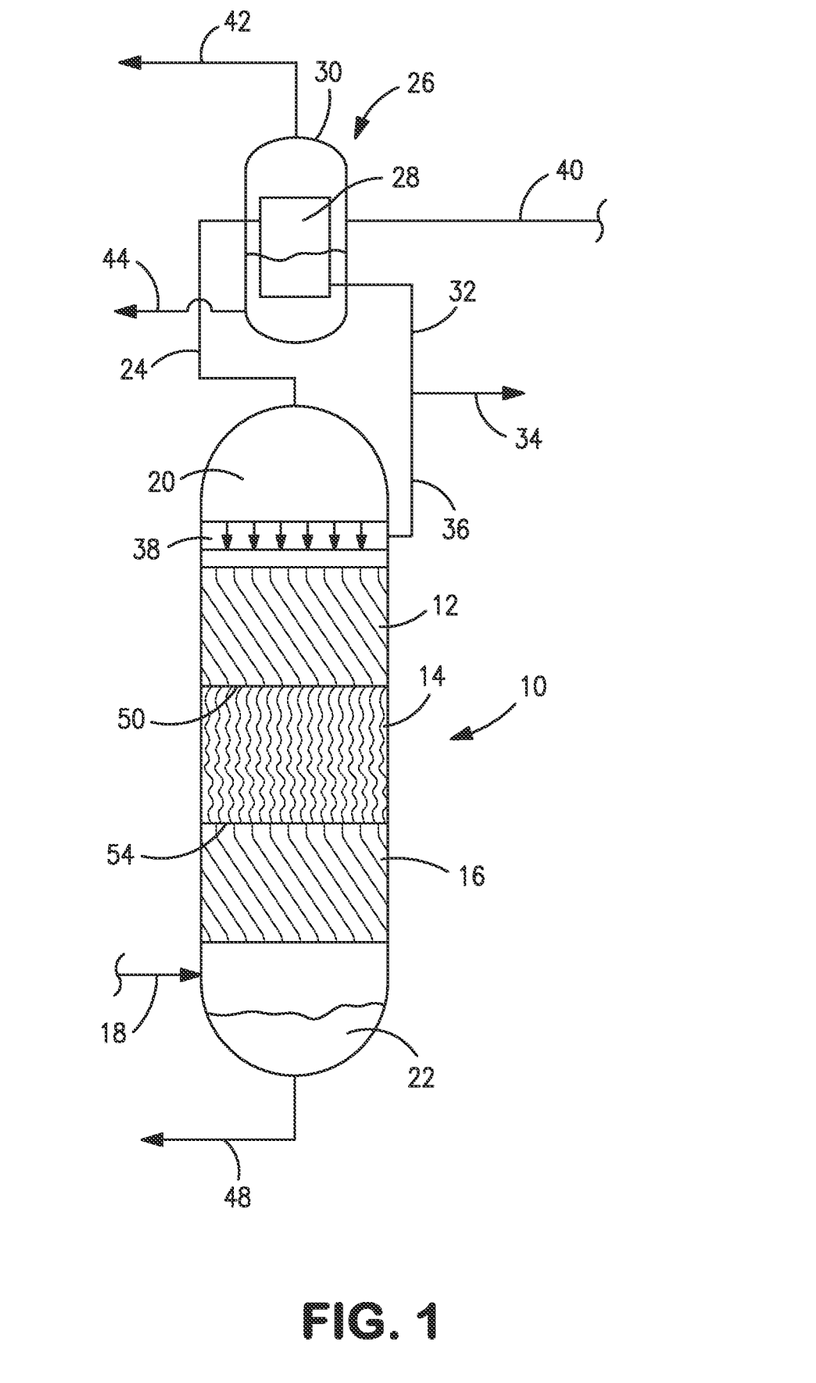
FIG. 1 is a schematic, sectional view of a distillation column that incorporates a structured packing in accordance with the present invention.

With reference to FIG. 1, for exemplary purposes only; and not by way of limitation, a distillation column 10 is illustrated that incorporates layers of structured packing in accordance with the present invention that are designated by reference numbers 12, 14 and 16. As illustrated, the rectangular sheets making up layer 14 is oriented at right angles to those of layers 12 and 16.

In operation, a feed stream 18 containing components of a mixture to be rectified is introduced into the base of distillation column 10 to initiate the formation of an ascending vapor phase that is intimately contacted, within layers 12, 14 and 16 with a descending vapor phase. This contact results in a column overhead vapor 20 that is rich in the more volatile components of the mixture to be separated and a column bottoms liquid 22 that is rich in the less volatile components of the mixture. A vapor column overhead stream 24, composed of the column overhead vapor 20 is introduced into a condenser 26. The vapor column overhead stream 24 condensed in a core 28 of the condenser 26 that is located within a shell 30 thereof. The vapor column overhead condenses to form a condensate stream 32 that is in turn divided into a product stream 34 and a reflux stream 36. It is understood that product stream 34 might be an intermediate product that would be further processed in succeeding unit operations. The reflux stream 36 is introduced into a liquid distributor 38 and initiates the formation of the descending liquid phase.

The coolant for the condenser 26 is introduced into the shell 30 as a coolant stream 40 that is partially vaporized to form a vapor phase stream 42 and a liquid phase stream 44. Again, for exemplary purposes, the feed stream 18 could be an oxygen and argon containing stream removed from a low pressure column of a distillation column system utilized in an air separation plant. In such case, the coolant stream 40 would be formed of an crude liquid column bottoms or kettle liquid of the high pressure column thermally linked to such low pressure column after having been depressurized by a valve not shown. The resulting vapor and liquid phase streams 42 and 44 would be reintroduced back into the low pressure column along with an oxygen-rich stream 48 formed of the liquid column bottoms 22. In practice there would be many more layers of structured packing than that illustrated and the product stream 40 could be a crude argon stream that would be further processed by removal of oxygen and nitrogen or could have sufficient number of stages of separation so as to separate the argon from the oxygen to such an extent that the product stream 40 would be a final product.

As mentioned above, a hydraulic capacity flooding limitation occurs with the downward liquid flow of the descending liquid phase is impeded as a result of excessive upflowing vapor and liquid being to build up at the interface between packing layers, which in distillation column 10 would be at interfaces 50 and 52. As will be discussed, the structured packing of the present invention provides a greater hydraulic capacity that the prior art and in addition, the structured packing in accordance with the present invention has an unexpected operational characteristic in which even though the pressure drop is increasing, the efficiency of the packing remains relatively unchanged. This allows a distillation to be conducted at a higher approach to flood than in the prior art.

Figure 2:
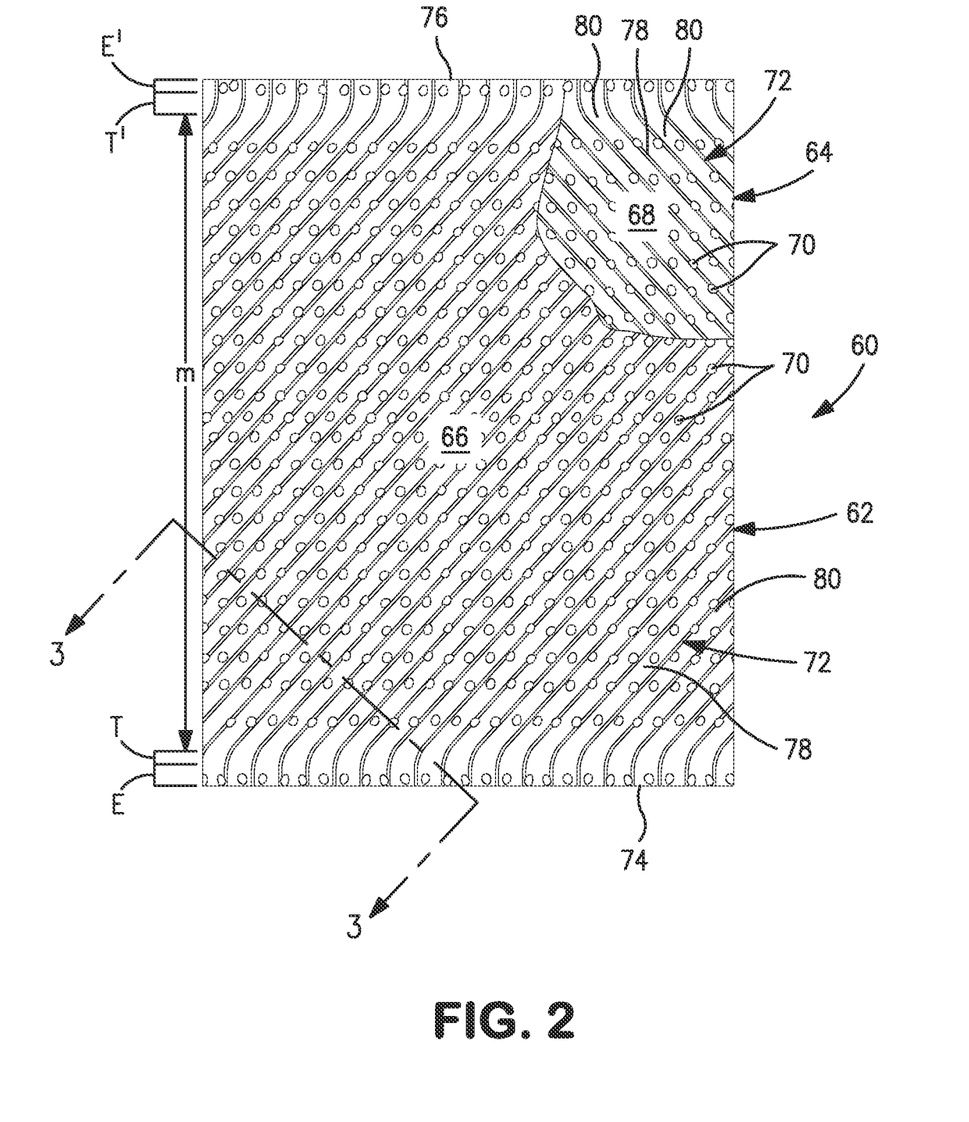
FIG. 2 is a plan view of a rectangular sheet of structured packing in accordance with the present invention with a portion broken away to show an adjacent sheet of structured packing.

With reference to FIG. 2, a structured packing 60 in accordance with the present invention is illustrated that could be used in the formation of layers 12, 14 and 16. Structured packing 60 is formed of rectangular sheets such as rectangular sheets 62 and 64. Each of the rectangular sheets 62 and 64 has two opposed surfaces 66 and 68. Since the orientation of each adjacent pair of sheets is reversed, rectangular sheet 62 would have an opposed surface 68 abutting rectangular sheet 64 and rectangular sheet 64 would have an opposed surface 66 on the reverse side thereof. In this regard, although two rectangular sheets 62 and 64 are illustrated, there would be many of such sheets all arranged in a side-by-side relationship in what are known in the art as "bricks" to form long strips of structured packing traversing the diameter of the distillation column, such as distillation column 10 and with the bricks also situated side-by-side to fill the traverse cross-section of the distillation column and thereby form the structured packing layers, such as 12, 14 and 16, described above.

Figure 3:
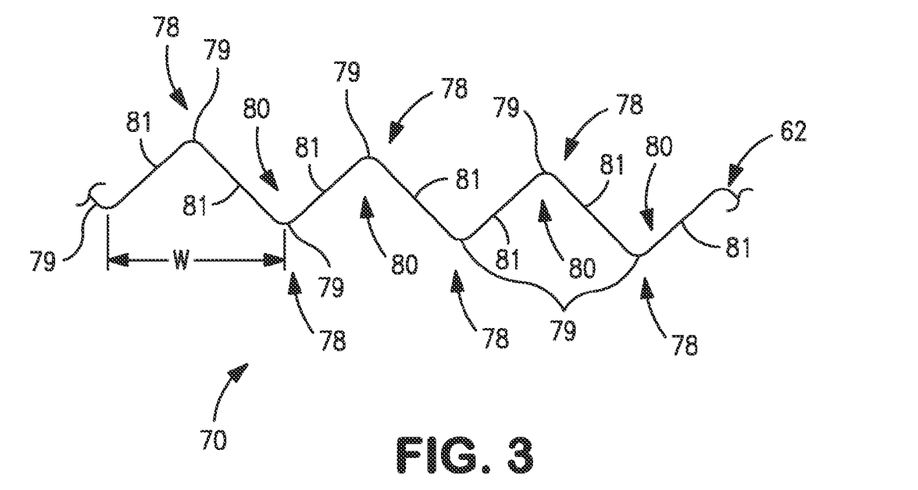
FIG. 3 is an edge view of a structured packing sheet in accordance with the present invention taken along line 3-3 of FIG. 2.

Each of the rectangular sheets 62 and 64 have a plurality of openings 70 located throughout and communicating between the two opposed surfaces 66 and 68. Additionally, each of the rectangular sheets 62 and 64 have corrugations 72 connecting two opposed edges 74 and 76 of and arranged in a repeating, undulating pattern having alternating peaks 78 and troughs 80 located adjacent to one another. With additional reference to FIG. 3, it is evident that the peaks 78 in surface 66 form the troughs in surface 68 and vice-versa. As illustrated, each of the corrugations is of triangular configuration and has a curved apex 79 and two equal sides 81 connected by the curved apex. It is to be noted, however, that although the corrugations 70 are therefore symmetrical, as would occur to those skilled in the art that the sides 81 could be of unequal length and/or could also be curved. Additionally, the curves peak 79 could be replaced by a sharper peak or a flattened peak. Neither of these possible configurations would be preferred in that it is believed that the best performance would be obtained with the curved apices such as apex 79. Further, each of the rectangular sheets and therefore, the corrugations 70 could optionally be provided with an embossed-like texture throughout.

Figure 4:
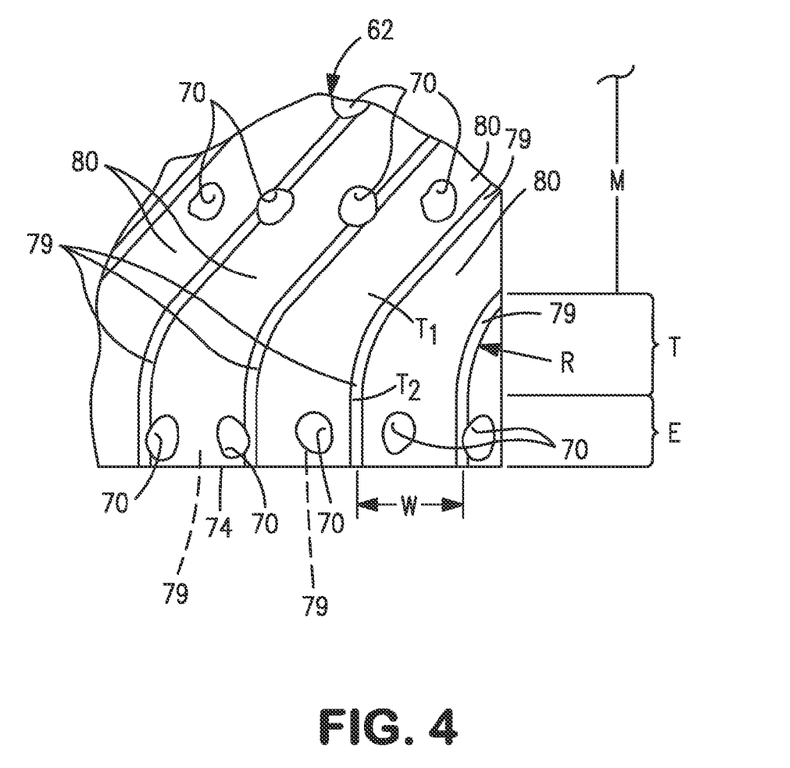
FIG. 4 is an enlarged, fragmentary view of FIG. 2.

With reference again to FIG. 2 and with additional reference to FIG. 4, the corrugations in each of the rectangular sheets, for example rectangular sheet 62 have end regions "E" and "E'" extending from opposed edges 74 and 76, respectively, a main region "M" spaced between the end regions "E" and "E'" and transition regions "T" and "T'" connecting the end regions "E" and "E'", respectively, to the main region "M" of the corrugations 72.

As illustrated, the corrugations 72 within the end region "E" are straight, parallel to one another and oriented at right angles to the opposed edge 74. Each of the corrugations 72 have a corrugation width "W" as measured between apices 79 of adjacent corrugations 72.

The corrugations 72 within the main region "M" are also straight and parallel to one another and oriented at an acute angle to the opposed edges 74 and 76. Typically, an acute angle of 45.0 degrees will be utilized. However, other angles can be used such as 40.0 degrees. The use of a shallower angle will increase the mass transfer contacting efficiency between the descending liquid and ascending liquid phases or in other words, decrease the HETP with a slight increase in the internal pressure drop within the structured packing itself. Other angles could of course be used, as would occur to those skilled in the art.

The corrugations 72 of the transition regions "T" have an arcuate configuration, that is they are arc-like in nature. Preferably, the corrugations within such regions are an arc of a circle and have a radius of curvature "R" which is preferably in a range of between 25.0 percent and 70.0 percent of each of the corrugation widths "W". Preferably the radius of curvature "R" is about 50.0 percent of the corrugation width "W". Here, the term "about" relates to the fact that the structured packing sheets are metal stampings and there will be some variation of corrugation width. Therefore, as used herein and in the claims, the term "about" means a value that can vary plus or minus 15 percent. This being said, embodiments of the present invention are possible in which such corrugations sections are not circular arcs and have a radius of curvature that slightly varies. It is also to be noted that a smooth transition exists within the transition regions "T" from the end regions "E" to the main region "M". On this point, a tangent drawn at the apex 79, at one end, "$T_1$" of any arcuate corrugation within the transition region "T" will be coincident with the a line passing through a peak 79 in the straight, parallel corrugations of the main region "M" and a tangent drawn at the apex 79, at the other end "$T_2$" of any arcuate corrugation of the transition region "T" will coincide with a line passing through the apex 79 of the adjoining straight, parallel corrugations within the end region "E". Put another way, the apices 79 of the straight, parallel sections of the corrugations within end and main regions "E" and "M" are coincident with tangents to the apices of the arcuate sections of the corrugations within the transition regions "T" at the opposite ends "$T_1$" and "$T_2$" thereof End Section "E'" is identical to end section "E", specifically described above. Transition region "T'", lying at the other end of the rectangular sheet has the same configuration as transition region "T", however, it is a mirror image thereof given that the arcuate sections of the corrugations 72 have to turn in a counter clockwise direction within the transition region "T'" to be able to connect the main region "M" with the end section "E'". The corrugations 72 within the transition region "T" turn is a clockwise direction for such purpose.

Embodiments of the present invention are possible in which only a single end section "E" and a single transition region "T" are employed at one edge of the rectangular sheet, for example edge 74 of rectangular sheet 62 which when assembled in a column would be the bottom edge of the structured packing. In such case, the main region "M" of the corrugations would extend to the other end 76 of the rectangular sheet. In practice, such embodiment would be employed with the end section "E" of the rectangular sheet located adjacent to the edges of the rectangular sheets where the main regions "M" of the rectangular sheets terminated. In this regard, it has been found by the inventors herein that only the lower portion of the rectangular sheets making up a structured packing layer in accordance with the present invention need be present to obtain a benefit of increased hydraulic capacity. However, it is far easier to accomplish the assembly and installation of a structured packing in accordance with the present invention end and transitions section "E" and "T" are employed at opposite edges of the rectangular sheets as has been illustrated herein.

As mentioned above, the plurality of rectangular sheets, for examples rectangular sheets 62 and 64 are situated in a side-by-side or juxtaposed arrangement and oriented so that the corrugations 72 within the end regions "E", the transition regions "T" and the main region "M" of any two adjacent pairs of the rectangular sheets are located opposite to one another and with the corrugations of the main region "M" in a crisscrossing relationship. In the main region "M" this would provide a great number of points of contact at the apices 79 of the corrugations to promote liquid vapor contact and mixing of the descending liquid and ascending vapor phases. The arcuate corrugations within the transition regions "T" and "T'" also cross one another, albeit at a single point of contact. The end section "E'" and transition region "T'" are identical to end and transition region "E" and "T".

The height of the corrugations 72 as measured between one peak to an adjacent peak, the number of corrugations per unit with of a rectangular sheet is dependent upon the desired density of the structured packing in accordance with the present invention. These foregoing variables are determined by the amount of mass transfer required in the unit volume of packing. As can be appreciated, as the density of the sheets increase, the width and spacing of the corrugations 72 will decrease. This will have an effect on the lengths of both the end section or sections "E" and "E'" and the transition region or sections "T" and "T'" which will have to be appropriately scaled. This length would be a measurement taken along a perpendicular to the edge 74 and/or 76 of the rectangular sheet 62. In this regard, preferably, each of the end regions "E" and "E'" have such a length within a range equal to about the corrugation width "W" multiplies by a constant in a range of between 0.3 and 4.0. More preferably, the range is between 1.0 and 3.0 and most preferably, the constant is equal to 2.0 and the length is also most preferably no less than the length is no less than about 1.27 cm. and no greater than about 3.81 cm. Once this is determined, the radius "R" used in the transition regions which is also a function of the corrugation width, will determine the length of either of the transition regions "T" and "T'". It is to be noted that an embodiment of a structured packing in accordance with the present invention could be constructed without the dimensional limitations of the length of the end regions "E" and "E'" and the radius of curvatures of the arcuate corrugation segments contained in the transition regions "T" and "T'". However as these dimensions are enlarged, the effect will be to shrink the length of the main region "M" where most of the liquid-vapor contact takes place. This will reduce the efficiency of the packing or in other words increase the HETP. On the other hand, reducing the length of the end sections "E" and "E'" will decrease the reduction of pressure drop at the interfaces. The same will hold true with a reduction in the radius of the arcuate sections of the corrugations within the transition section "T" and "T'".

Although the inventors herein do not wish to be limited to a particular theory of operation, it is believed that the straight, parallel section of corrugations 72 within the end regions "E" and "E'" act in a manner as in the prior art to provide an unimpeded path for the ascending vapor to pass from an underlying layer of structured packing such as layer 16 and for the descending liquid to fall from the overlying layer of structured packing 14 to the underlying layer of structure packing 16. The internal arcuate transition regions "T" and "T'" provide a pathway for a gradual change in direction of the ascending vapor and the descending liquid internally within the structured packing to lower an internal pressure drop that has an additional influence on the pressure drop at the interface between structured packings, for instance, interfaces 50 and 54 shown in FIG. 1. This additional influence increases the hydraulic capacity and related flooding limit of a structured packing in accordance with the present invention. It has an additional effect that was unforeseen by the inventors herein that the operation flooding limit characterized by a rapid rise in HETP is delayed and will not vary greatly upon the hydraulic flooding limit being reached. As a result, a distillation column utilizing a structured packing in accordance with the present invention can be operated at a closer approach to the hydraulic flooding limit than in the prior art, namely 85 percent to 90 percent of such flooding limit as compared to 80 percent. This allows a high production rate of the separated products than in a structured packing of the prior art.

Figure 5:
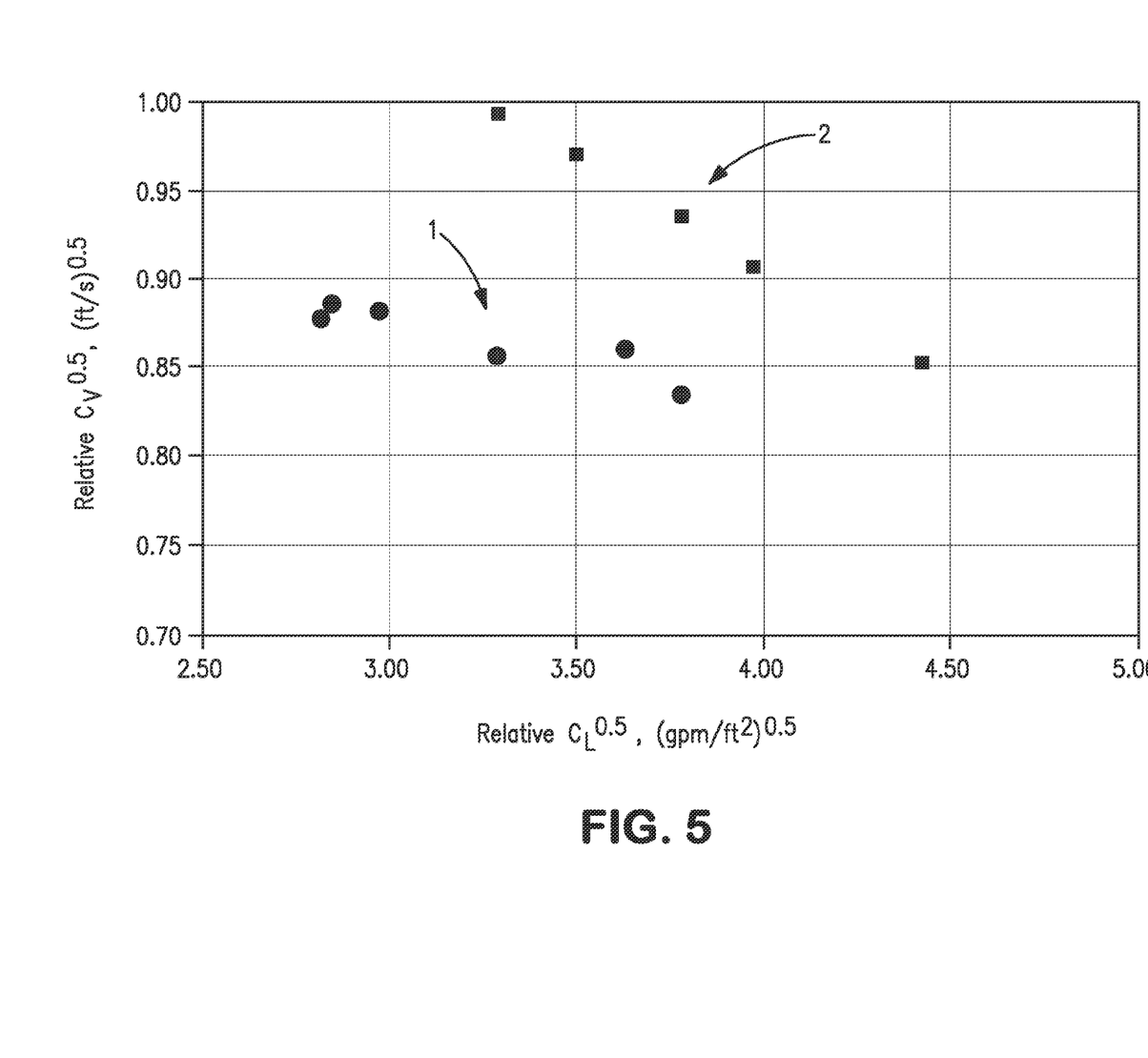
FIG. 5 is a graphical representation of a Wallis plot comparing the hydraulic capacity of a structured packing in accordance with the present invention and a prior art structured packing.
Figure 6:
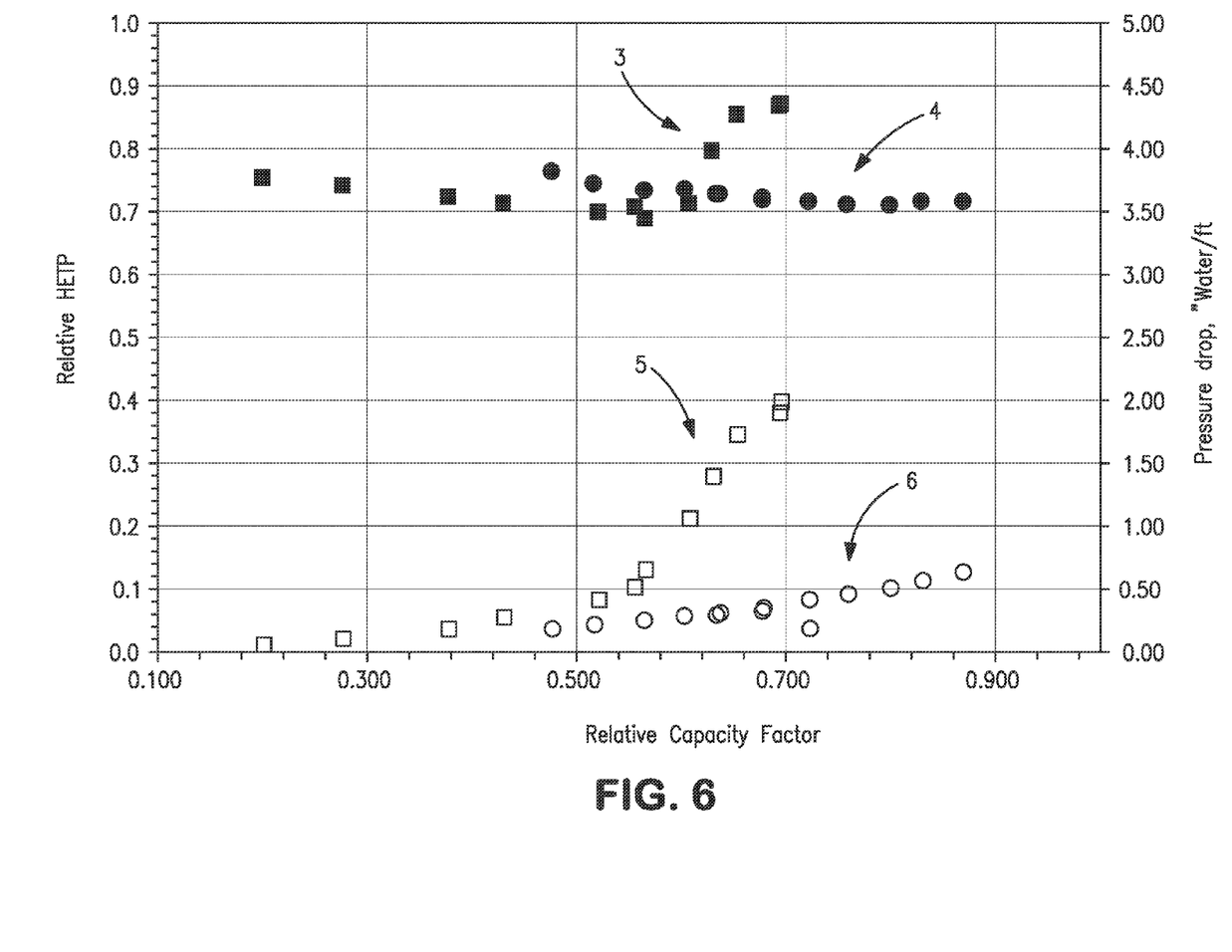
FIG. 6 is a graphical representation of HETP and pressure drop as a function of relative capacity comparing a structured packing in accordance with the present invention and a prior art structured packing.
Figure 7:
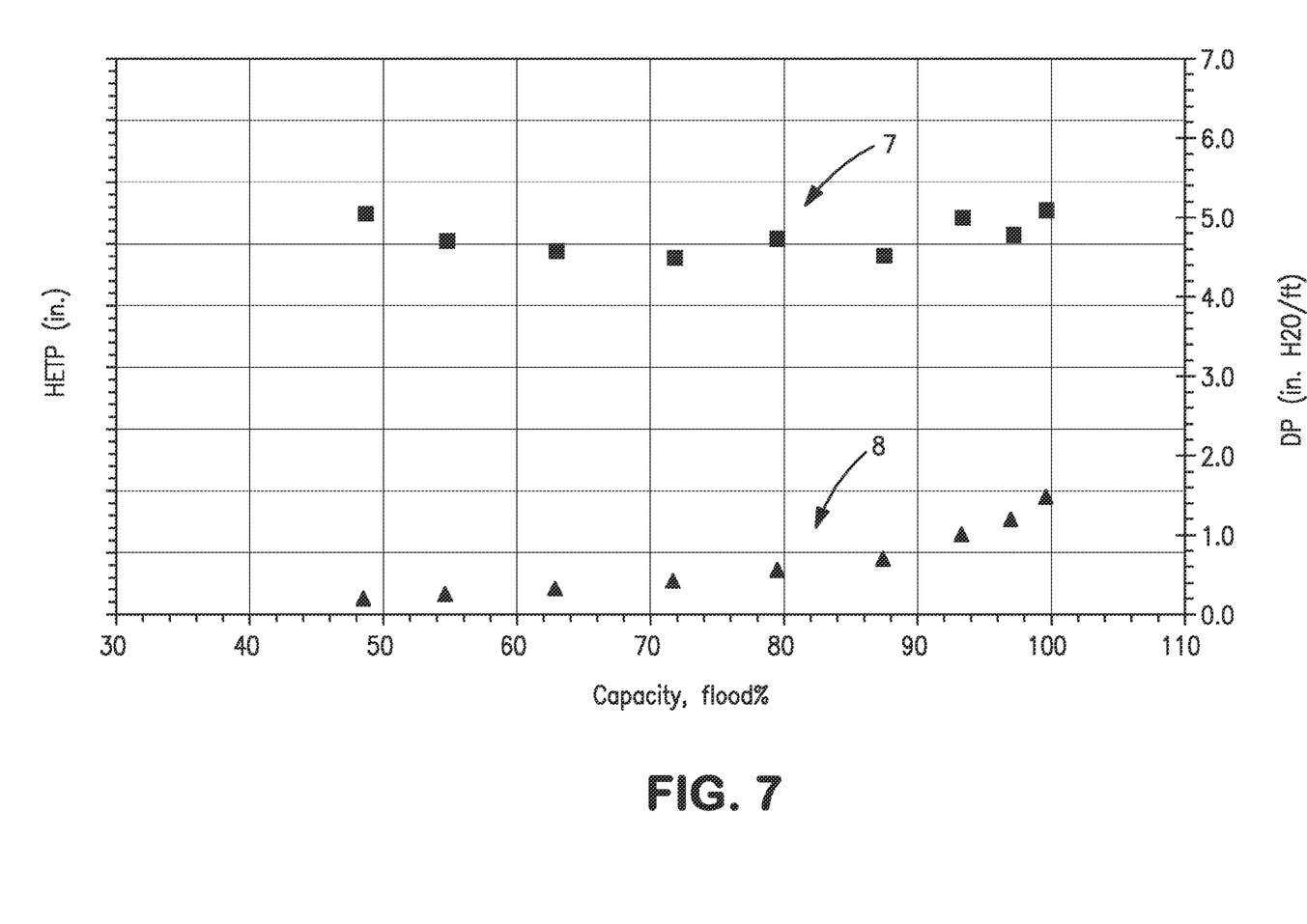
FIG. 7 is a graphical representation of HETP and pressure drop as a function of a percentage of hydraulic flooding of a structured packing in accordance with the present invention having a higher density than the structured packing tested in FIGS. 5 and 6.

The foregoing has been experimentally demonstrated. With reference to FIGS. 5, 6 and 7, a structured packing of the type shown in the preceding Figures was tested in a test column in which under conditions of total reflux. Eight bricks of structured packing were utilized in the test column. Each brick was approximately 10 inches in height and 12 inches in diameter. Each brick constituted one layer in the column. In these tests, the capacity of various packings was tested by measuring the pressure drop over the bed at various flow rates of an incoming vapor stream.

With specific reference to FIG. 5, a comparative Wallis plot is illustrated comparing the flooding characteristics of two structured packings having a density of 750 m²/m³. The structured packing 1 shown by the solid circles is a prior art packing having corrugations extending from one end to the other at a constant angle of 45°. The structured packing 2 is a structured packing in accordance with the present invention in which the corrugations within the main region are at 45°, the corrugation width "W" within the end section is 7.3 mm and the radius "R" used in the transition region is 50.0 percent of the separation distance. The tests were carried out in the test column with eight bricks of 10 inches high and at various liquid and vapor rates. As would be well known in the art, the vapor rate is $C_v$ which is equal to $(M_G/\rho_G A)(\rho_G/\rho_L-\rho_G)^{1.0}$ and the liquid rate is $C_L$ which is equal to $(M_L/\rho_L A)(\rho_{LG}/\rho_L-\rho_G)^{1.0}$; where $M_G$ is the mass flow rate of the gas, $M_L$ is the mass flow rate of the liquid, "A" is the transverse, crossectional area of the packing, $\rho_L$ is the density of the liquid and $\rho_G$ is the density of the gas. In a Wallis plot, the data points are fit to a curve having the equation $C_v^{0.5}+aC_L=b$. The liquid rate is expressed in relative units of the square root of liquid flow/packing transverse cross-sectional area. As is apparent from this graph, the capacity of the structured packing in accordance with the present invention is always higher or in other words, for any given liquid rate, the vapor rate is higher. In fact, liquid rates from the structured packing 2 in accordance with the present invention can be obtained that are not possible in a conventional structured packing 1, namely at near a relative liquid rate approaching 4.50.

With reference to FIG. 6, tests were conducted in the test column with an argon oxygen mixture of the type that would be obtained from a low pressure column. For such purposes eight bricks of structured packing were utilized in the test column. Each brick was approximately 10 inches in height and 12 inches in diameter. Each brick constituted one layer in the column. Again, structured packing having a density of 750 m²/m³ was tested having the characteristics set forth above in order to directly compare performance of the prior art structured packing with a structured packing in accordance with the present invention. While pressure drop was determined through measurements of pressure at the top and bottom of the column and such data is presented, relative HETP and Capacity data, namely, $C_v$ is presented which are the actual data points divided by a constant. The data shown by the squares represents the prior art structured packing and the data shown by the circles represents the structured packing of the present invention. Solid squares and circles is used to designate HETP performance and unshaded squares and circles show the pressure drop performance. As is evident from this graph, hydraulic flooding begins in the prior art structured packing well before the structured packing in accordance with the present invention even begins to flood as shown at 3 and 4, respectively. Furthermore, at about the time the prior art structured packing reaches hydraulic flooding, at about the same time operational flooding limitations are occurring as evidenced by the rapid rise in HETP as shown at 5. With respect to the structured packing in accordance with the present invention, not only has the HETP remained relatively flat, as shown at 6, but also operational flooding limitations have not even been approached.

Similar data has been obtained for structured packing having even higher densities. For example, with reference to FIG. 7, a structured packing in accordance with the present invention was tested having a density of 940 m²/m³ in the test column and in the manner set forth above. As is evident the HETP as shown by the data represented by the solid squares again remain essentially flat, even up to a $C_v$ that constituted hydraulic flooding conditions. As a result, a packing in accordance with the present invention, independent of density not only has a higher hydraulic capacity, but operations are allowed at a closer approach to flooding conditions than in the prior art. Consequently, with a column in accordance with the present invention can be operated at a closer approach to hydraulic flooding conditions than the prior art and in fact operations at $C_v$'s having an approach to flood of between 85 percent and 90 percent are quite feasible. This of course either allows more greater flows and higher production for a given column or a reduction in column diameter resulting in lower fabrication costs.

Although the present invention has been described with reference to preferred embodiments, as will occur to those skilled in the art, numerous changes, additions and omission can be made without departing from the sprit and scope of the invention as set forth in the appended claims.

We claim:

1. A structured packing comprising:
   a plurality of corrugated sheets arranged in a juxtaposed relationship, each corrugated sheet comprising:
   (a) two opposed surfaces;
   (b) two opposed edges;
   (c) a plurality of openings located throughout the corrugated sheets and communicating between the two opposed surfaces; and
   (d) a plurality of corrugations disposed on the opposed surfaces extending between the two opposed edges and arranged in a repeating, undulating pattern having alternating peaks and troughs on the opposed surfaces, and wherein each of the plurality of corrugations further comprise:
   (i) a first end region disposed proximate one of the two opposed edges and a second end region disposed proximate the other of the two opposed edges, wherein the end regions of the plurality of corrugations further comprise a plurality of straight, parallel sections extending inwardly from the two opposed edges at right angles thereto and wherein each of the straight, parallel sections of the end regions have a length equal to about a corrugation width of the corrugations multiplied by a constant within a range between 2.0 and 3.0;
   (ii) a main region centrally disposed on the opposed surfaces away from the at least one of the opposed edges, wherein the main regions of the plurality of corrugations further comprise a plurality of straight, parallel sections oriented at an acute angle to the two opposed edges; and
   (iii) a first transition region disposed between and connecting the first end region and the main region and a second transition region disposed between and connecting the second end region and the main region, wherein the transition regions of the plurality of corrugations further comprise a plurality of arcuate sections connecting the straight, parallel sections of the main regions with the straight, parallel sections of the end regions;
   wherein a plurality of corrugated sheets are configured such that that apices of the peaks of the corrugations in the straight, parallel sections of the main region are coincident with tangents to the apices of the peaks of the corrugations in the arcuate sections of the transition regions;
   wherein the plurality of corrugated sheets are oriented such that the end regions, the main region and the transition regions of the corrugations on each of the plurality of corrugated sheets are vertically aligned with one another; and
   wherein the straight, parallel sections of the main regions of the corrugations on adjacent corrugated sheets are oriented in a crisscrossing relationship.

2. The structured packing of claim 1, wherein each of the apices is curved and each of the plurality of corrugations has a triangular, transverse cross-section with two equal sides connected by the curved apices.

3. The structured packing of claim 1, wherein the arcuate sections of the transition regions each have a radius of curvature in a range of between about 25.0 percent and about 75.0 percent of the corrugation width.

4. The structured packing of claim 1, wherein the radius of curvature is about 50.0 percent of the corrugation width.

5. The structured packing of claim 1, wherein the length of the straight, parallel sections of the end regions is no less than about 1.27 cm and no greater than about 3.81 cm.

6. The structured packing of claim 1, wherein the acute angle is between about 40 degrees and 45 degrees.

* * * * *